United States Patent
Goodwin et al.

(10) Patent No.: US 11,080,712 B2
(45) Date of Patent: Aug. 3, 2021

(54) SECONDARY ACCOUNT MANAGEMENT PLATFORM

(71) Applicant: Visa International Service Association, San Francisco, CA (US)

(72) Inventors: Kellie Goodwin, San Francisco, CA (US); David Henstock, San Francisco, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 131 days.

(21) Appl. No.: 16/126,957

(22) Filed: Sep. 10, 2018

(65) Prior Publication Data

US 2019/0080309 A1 Mar. 14, 2019

Related U.S. Application Data

(60) Provisional application No. 62/556,945, filed on Sep. 11, 2017.

(51) Int. Cl.
| | |
|---|---|
| *G06Q 20/40* | (2012.01) |
| *G06Q 20/22* | (2012.01) |
| *G06Q 20/36* | (2012.01) |

(52) U.S. Cl.
CPC ......... *G06Q 20/405* (2013.01); *G06Q 20/227* (2013.01); *G06Q 20/229* (2020.05); *G06Q 20/3672* (2013.01); *G06Q 20/3676* (2013.01); *G06Q 20/401* (2013.01)

(58) Field of Classification Search
None
See application file for complete search history.

(56) References Cited

U.S. PATENT DOCUMENTS

| | | | |
|---|---|---|---|
| 6,249,905 B1* | 6/2001 | Yoshida | G06F 8/24 715/744 |
| 8,127,982 B1* | 3/2012 | Casey | G06Q 20/35785 235/379 |
| 8,401,904 B1* | 3/2013 | Simakov | G06Q 20/3572 705/16 |
| 8,560,449 B1* | 10/2013 | Sears | G06Q 20/206 705/42 |

(Continued)

FOREIGN PATENT DOCUMENTS

WO   WO-2009114489 A1 *  9/2009 ....... G06F 16/24564

*Primary Examiner* — Jacob C. Coppola
(74) *Attorney, Agent, or Firm* — Kilpatrick Townsend & Stockton LLP

(57) ABSTRACT

Embodiments of the disclosure are directed to methods and systems for enabling generation and management of a secondary account. The secondary account may be generated in relation to a primary account, such that at least a portion of a transaction conducted using the secondary account may be charged to the primary account. In some embodiments, the secondary account may be associated with a number of protocols to be applied to a transaction. When a transaction is initiated using the secondary account, a service provider may consult an itinerary to dynamically generate a set of protocols which is relevant to the transaction based on a time period during which the transaction is initiated. In some embodiments, portions of the transaction may be split up and transmitted to different authorization entities for authorization.

11 Claims, 9 Drawing Sheets

(56) References Cited

U.S. PATENT DOCUMENTS

| | | | |
|---|---|---|---|
| 10,587,623 B2 * | 3/2020 | Chauhan | H04L 63/102 |
| 2002/0062249 A1 * | 5/2002 | Iannacci | G06Q 20/10 |
| | | | 705/14.1 |
| 2005/0273431 A1 * | 12/2005 | Abel | G06Q 20/02 |
| | | | 705/42 |
| 2006/0015463 A1 * | 1/2006 | Gupta | G06Q 20/401 |
| | | | 705/52 |
| 2009/0192904 A1 * | 7/2009 | Patterson | G06Q 20/20 |
| | | | 705/17 |
| 2010/0268645 A1 * | 10/2010 | Martino | G06Q 20/28 |
| | | | 705/44 |
| 2012/0209772 A1 * | 8/2012 | Nuzzi | G06Q 20/40 |
| | | | 705/44 |
| 2013/0290184 A1 * | 10/2013 | Shapiro | G06Q 20/351 |
| | | | 705/44 |
| 2016/0239842 A1 * | 8/2016 | Cash | G06Q 20/35785 |
| 2017/0011399 A1 * | 1/2017 | Steinlicht | G06Q 20/3263 |
| 2018/0225666 A1 * | 8/2018 | Khan | G06Q 20/20 |

* cited by examiner

SECONDARY ACCOUNT MANAGEMENT PLATFORM

CROSS-REFERENCES TO RELATED APPLICATIONS

This application claims the benefit of and priority to U.S. Provisional Patent Application No. 62/556,945, filed Sep. 11, 2017, which is fully incorporated by reference herein.

SUMMARY

A system and techniques for enabling generation and management of a secondary account are described herein. A secondary account may be generated in relation to a primary account, such that at least a portion of a transaction conducted using the secondary account may be charged to the primary account. In some embodiments, the secondary account may be associated with an itinerary and a number of protocols that may be applied to a transaction. When a transaction is initiated using the secondary account, a service provider may consult the itinerary to determine one or more statuses currently associated with the secondary account. The service provider may then dynamically generate a set of protocols which is relevant to the transaction based on a time period during which the transaction is initiated and the determined statuses. In some embodiments, portions of the transaction may be split up and transmitted to different authorization entities for authorization. For example, if a transaction is only partially in compliance with a protocol (e.g., the transaction is over a limit indicated within a protocol) then a first portion of the transaction may be charged to the primary account and the remainder of the transaction may be charged to a different primary account (e.g., a primary account belonging to the secondary user).

One embodiment of the disclosure may be directed to a method, comprising: receiving a request to generate a secondary account in relation to a primary account, generating the secondary account in association with a number of protocols, transmitting an identifier for the secondary account to a client device associated with the secondary account, upon receiving a request to complete a transaction that includes the identifier for the secondary account, generating a set of protocols from the number of protocols, determining whether the transaction is in compliance with the set of protocols, and completing the transaction using the primary account.

Another embodiment of the disclosure may be directed to a server device comprising: a processor; and a memory including instructions that, when executed with the processor, cause the server device to, at least: receive a request to generate a secondary account in relation to a primary account, generate the secondary account in association with a number of protocols, transmit an identifier for the secondary account to a client device associated with the secondary account, upon receiving a request to complete a transaction that includes the identifier for the secondary account, generate a set of protocols from the number of protocols, determine whether the transaction is in compliance with the set of protocols, and complete the transaction using the primary account.

These and other embodiments of the disclosure are described in further detail below, with reference to the Figures and Detailed Description.

DETAILED DESCRIPTION

Figure 1:
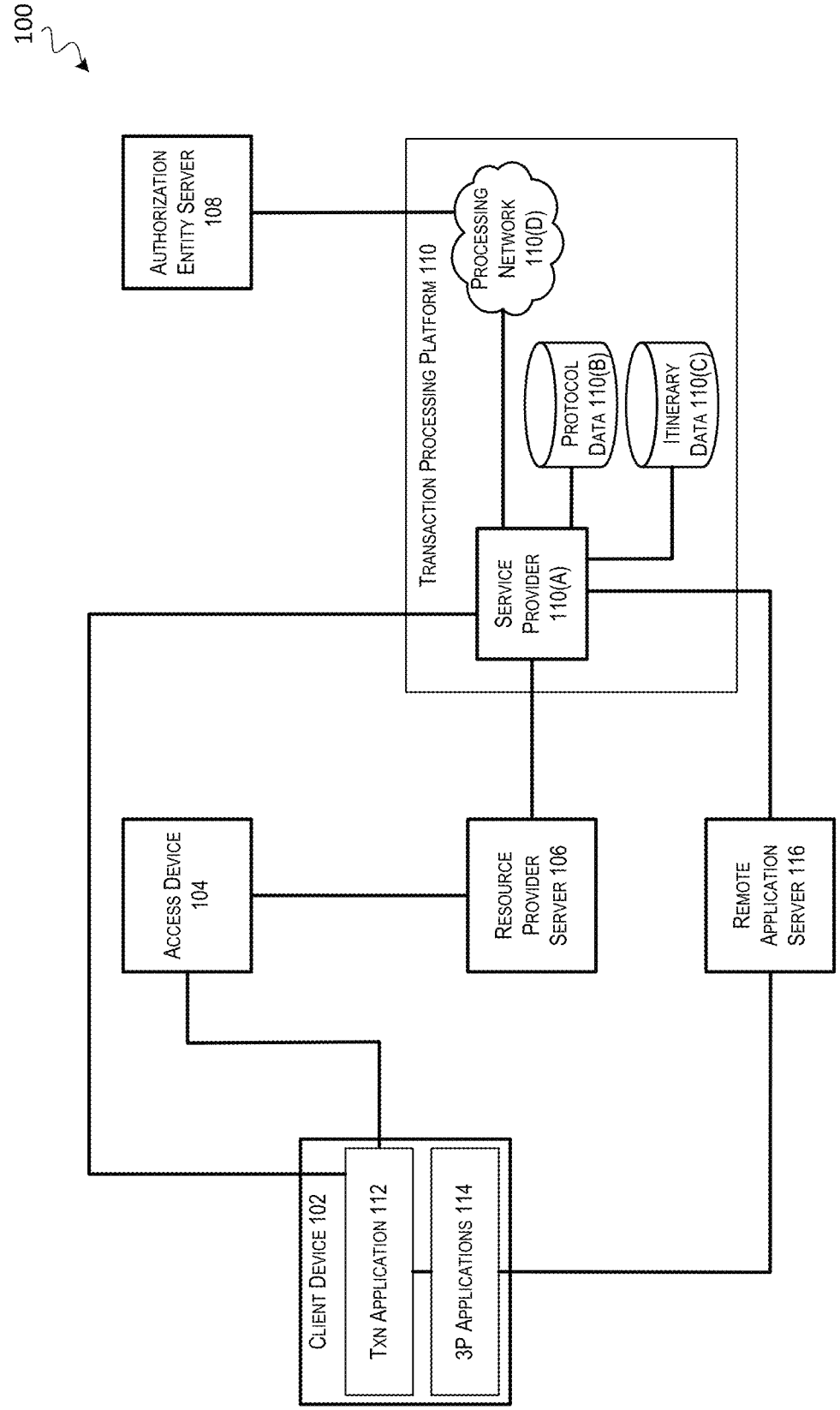
FIG. 1 depicts a number of components that may be involved in a system used to implement at least some embodiments of the disclosure.

Embodiments of the disclosure and the advantages that they provide are discussed in further detail below. The following list of terms provides description of certain features in the embodiments.

An "application" may include a computer program, computer code, or computer instructions that are used to implement a certain method. An application may be stored in a memory unit and executed by processor (e.g., of a mobile communication device). An application may present a graphical user interface to a user (e.g., on a display). The user may select certain functions of the client device to be executed by providing input to the user interface. A mobile application may be an example of an application which is specific to mobile client devices.

"Authentication data" may include any data suitable for authenticating a user or mobile device. Authentication data may be obtained from a user or a device that is operated by the user. Examples of authentication data obtained from a user may include PINs (personal identification numbers), passwords, etc. Examples of authentication data that may be obtained from a device may be include device serial numbers, hardware secure element identifiers, device fingerprints, phone numbers, IMEI numbers, etc.

"Access data" may include any suitable data that can be used to access a resource or create data that can access a resource. In some embodiments, access data may be account information for a payment account. Account information may include a primary account number (PAN), payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. This specific information may be characterized as access information in some embodiments. In other embodiments, access data could include data that can be used to access a location. Such information may be ticket information for an event, data to access a building, transit ticket information, etc.

An "access device" may be any suitable device for obtaining access to a resource. An access device may generally be located in any suitable location, such as at the location of a merchant. An access device may be in any suitable form. Some examples of access devices include POS devices, cellular phones, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device.

An "account statement" may include a summary of transactions that have occurred over a given period on an account held by a person (e.g., a user) or business an institution (e.g., an issuer of the account). The account statement may include a list of transactions and at least a portion of the information included in transaction records for those transactions. An account statement may also include transaction identifiers, information regarding the total transaction amount, the amount of tax paid and/or the amount of tax collected in the transaction.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "authorization protocol" or "protocol" may include any setting, instruction, or set of instructions that indicates an authorization rule to be applied under a set of circumstances. In some embodiments, an authorization protocol may include a set of computer executable instructions that, when executed by a processor, cause one or more conditions associated with the authorization protocol to be tested for. In some embodiments, the authorization protocol may be associated with an acceptable range or acceptable value for one or more transaction values. In some embodiments, the authorization protocol may be associated with one or more success actions and/or failure actions that may be executed in the event of a pass or failure (e.g., with respect to a determination that the transaction is in compliance with the authorization protocol). In some embodiments, a failure of one authorization protocol may trigger execution of a second authorization protocol. In some embodiments, an authorization protocol may take the form of an extensible markup language (xml) document or text-based document. For example, an authorization protocol may be an xml document that includes data in a format similar to:

```
<Authorization_Protocol_Title>
    < priority>
        <7.9>
    </priority>
    <rule>
        <currency.threshold(30.00)>
    </rule>
    <applicability>
        <traveling_event( )>
    </applicability>
    <success_actions>
        <>
    </success_actions>
    <failure_actions>
        <charge_excess(30.00)>
    </failure_actions>
</Authorization_Protocol_Title>
```

In this example, the authorization protocol may be parsed to identify a priority of the authorization protocol, conditions under which the authorization protocol may be found relevant ("applicability"), one or more limitations for transactions, and one or more success and failure actions. It should be noted that the provided example authorization protocol is intended as a non-limiting example; a number of equivalent protocols may be envisioned by one skilled in the art.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "client device" or "communication device" may comprise any electronic device that provides remote communication capabilities with a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. A client device may be a mobile device. Examples of client devices include mobile phones (e.g., cellular phones), tablet computers, net books, laptop computers, personal music players, hand-held specialized readers, wearable devices (e.g., watches), vehicles (e.g., cars), etc. A client device may comprise any suitable hardware and software for performing such functions, and may also include multiple devices or components (e.g., when a device has remote access to a network by tethering to another device—i.e., using the other device as a relay—both devices taken together may be considered a single mobile device).

A "digital wallet" or "e-wallet" can include an electronic device or application that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may allow the user to load one or more payment cards onto the digital wallet so as to make a payment without having to enter an account number or present a physical card. A digital wallet application may allow the user to view an account statement including information regarding transactions conducted on accounts loaded on the digital wallet.

A "failure action" may include an indication of an action to be executed upon determining that a transaction is not in compliance with the associated protocol (e.g., an authorization protocol). A failure action may be stored in association with an authorization protocol (e.g., within a database table or within an xml document for the protocol). Failure actions may be executed by a service provider computer or by a client device (e.g., the failure action may specify by which entity it is to be performed). In some embodiments, multiple failure actions may be associated with a single protocol. In some cases, a failure action may cause a transaction to be declined or rejected. In some cases, a failure action may cause some further action to be taken with respect to the transaction upon authorization of the transaction (i.e., the transaction may not automatically be declined upon failure).

An "itinerary" may be any indication of one or more statuses to be associated with a secondary account with respect to time. In some embodiments, an itinerary may include at least some period of time over which a secondary account may be active as well as an indication as to what statuses are relevant to the secondary account at any given time. In some embodiments, an itinerary may include an indication of a primary user or supervisor to be associated with the secondary account at any given time. In some cases, this indication may be accompanied by a communication channel via which that primary user or supervisor may be contacted.

A "memory unit" may be any device that can store electronic data. A memory unit may comprise a computer readable storage medium or a non-transitory computer readable medium. The memory unit may store instructions that can be executed by a processor to implement a method. For example, a memory unit may one or more memory chips, a random access memory (RAM) circuit, a read-only memory (ROM) circuit, a magnetic medium such as a hard-disk drive or a floppy disk drive, or an optical medium such as a compact disc.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron, Opteron, Phenom, FX, and/or APU; IBM and/or Motorola's PowerPC; IBM's and Sony's Cell processor; Intel's Celeron, Itanium, Pentium, Xeon, XScale, and/or Corei7; and/or the like processor(s).

A "resource provider" may be an entity that can provide a resource such as goods, services, information, and/or access to such a resource. Examples of a resource provider include merchants, online or other electronic retailers, access devices, secure data access points, etc. A "merchant" may typically be an entity that engages in transactions and can sell goods or services, or provide access to goods or services. A "resource provider computer" may be any computing device operated by a resource provider.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "token" may refer to a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be a random string of characters. In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" may refer to a process by which data is replaced with substitute data. For example, an account identifier (e.g., a primary account number (PAN)) may be tokenized by replacing the account identifier with a substitute number (e.g., a token) that is associated with the account identifier. Further, tokenization may be applied to other information which may be replaced with a substitute value. Tokenization may be used to enhance transaction efficiency, improve transaction security, increase service transparency, or to provide a method for third-party enablement.

A "token service provider" may refer to an entity including one or more server computers that generates, processes, and/or maintains tokens. A token service provider may include or be in communication with a token vault where the generated tokens are stored. Specifically, the token vault may maintain one-to-one mapping between a token and the data (e.g., a real account identifier) represented by the token. A token service provider may provide reports or data output to reporting tools regarding approved, pending, and/or declined token requests. The token service provider may provide data output related to token-based transactions to reporting tools and applications and present the token and/or the data substituted by the token (e.g., real account identifiers) as appropriate in the reporting output.

A "token vault" may refer to a repository that maintains established token-to-PAN mappings. According to various embodiments, the token vault may also maintain other attributes of the token requestor that may be determined at the time of registration and that may be used by the token service provider server to apply domain restrictions or other controls during transaction processing. The token vault may be a part of the token service system. In some embodiments, the token vault may be provided as a part of the token service provider server. Alternatively, the token vault may be a remote repository accessible by the token service provider server. Token vaults, due to the sensitive nature of the data mappings that are stored and managed in them, may be protected by strong underlying physical and logical security.

A "transaction" may be any interaction or exchange between two or more parties. For example, a transaction may include a first entity requesting resources from a second entity. In this example, the transaction is completed when the resources are either provided to the first entity or the transaction is declined.

A "transaction processing network," or "processing network," may refer to an electronic payment system used to accept, transmit, or process transactions made by payment devices for money, goods, or services. The processing network may transfer information and funds among authorization entities (e.g., issuers), acquirers, merchants, and payment device users.

FIG. 1 depicts a number of components that may be involved in a system used to implement at least some embodiments of the disclosure. In FIG. 1, a client device 102 may be in communication with a number of remote entities via a network connection (either wireless or physical). For example, the client device 102 may be used to conduct a transaction with an access device 104 which is maintained by a resource provider server 106 or an authorization entity server 108. In some embodiments, the client device 102 may interact with a remote resource provider server 106 that maintains an internet presence (e.g., via a browser application). The resource provider server 106 may, in turn, be in communication with a transaction processing platform (TPP) 110.

In some embodiments, the client device 102 may have installed on it a transaction application 112 as well as a number of third party (3P) applications 114, which are examples of mobile applications. The 3P applications 114 may be configured to cause the client device 102 to communicate with a number of remote application servers 116 in order to complete a transaction for a user of the client device 102. In some embodiments, the transaction application 112 may be configured to communicate with one or more of the 3P applications 114. For example, the mobile applications may communicate via application programming interface (API) calls or other suitable means.

In some embodiments of the disclosure, the client device 102 may be a mobile device (e.g. a mobile phone). The mobile device may be capable of communicating with cell towers (e.g., via cellular communications such as GSM, LTE, 4G) and wireless routers (e.g., via WiFi). The mobile device may store the user's account credentials, such as a PAN (primary account number), a token, a name, an address, a CVV, an expiration date, and any other suitable information. The mobile device may also store one or more tokens or virtual card identifiers associated with the mobile device itself or applications installed upon the mobile device. Such data may be securely stored via hardware (e.g., a secure element) or software.

In some embodiments, a resource provider associated with the resource provider server 106 may be a merchant that maintains a physical retail presence (e.g., a store). In these embodiments, the access device 104 may a point-of-sale (POS) device. In some embodiments, the resource provider server 106 may be affiliated with an online retailer or another suitable resource provider having an electronic catalog. The resource provider server 106 may serve one or more pages of a resource provider website to a browser installed on the client device 102.

In some embodiments of the disclosure, the authorization entity server 108 may be any computing device configured to determine whether or not to approve a transaction to be conducted by a particular user. The authorization entity server 108 may maintain a number of accounts, one or more of which are associated with particular users. Each account may be associated with some amount of a resource (e.g., a balance) upon which authorization for a transaction may be based. In some embodiments, upon successful enrollment of a user into the system described herein, the authorization entity server 108 may generate a token (e.g., a virtual card identifier) to be associated with the user and may provide that token to the transaction processing platform 110 to be bound to, and forwarded to, the client device 102.

In some embodiments, the system may be implemented across one or more transaction processing platforms 110. The transaction processing platforms 110 may each be associated with a transaction processing network. Each SRT platform may include some combination of an service provider server (or servers) 110(A), token data 110(B), protocol data 110(C), and a processing network 110(D). Multiple accounts may be associated with a single transaction processing platform. For example, a user may be associated with two different accounts which are each associated with different authentication entities and/or different projects, while both accounts are able to be processed using a single transaction processing platform.

In some embodiments, the service provider server 110(A) may be configured to generate and manage secondary accounts (e.g., virtual cards) associated with a primary account. For example, the service provider 110(A) may be configured to generate a secondary account associated with a token to be linked to a particular primary account number (PAN), such that transactions completed using the secondary account are charged to the primary account upon determining that they comply with protocols set in place. This enables a user of a primary account to create a limited secondary account for an employee (e.g., a contractor) or other dependent while controlling how that secondary account can be used. The service provider server 110(A) may also be configured to process authorization request messages received in relation to one or more transactions to be conducted using a secondary account, dynamically generate a set of protocols for that transaction based on itinerary data 110(C) for that secondary account, and determine whether to approve or decline the transaction based on the generated set of protocols. The service provider server 110(A) may be further configured to provide authorization response messages indicating the approval status of the transaction.

The third party applications 114 may be any suitable set of computer-executable instructions installed on the client device 102 that, when executed, causes the client device 102 to perform some primary function related to resource procurement. For example, the third party application 114 may obtain transportation services for the user of the client device 102.

The remote application server 116 may be any suitable computing device that provides support for a third party application 114. In some embodiments, the remote application server 116 may perform processing on behalf of the third party application 114. For example, the third party application 114 may cause the client device 102 to obtain a resource for a user of the client device 102. In doing so, payment data may be collected by the third party applications 114, which may be transmitted to the remote application server 116 that corresponds to the third party application used to complete a transaction for the resource. In this example, the payment data may include a token provided by the transaction application 112. In some embodiments, the remote application server 116 may also be a resource provider server 106. For example, the remote application server 116 may support a 3P application 112 installed upon the client device 102 that provides a service (e.g., a ride share application). In this example, the remote application server 116 may be configured to complete transactions via the client device 102.

For an illustrative example of at least some embodiments of the disclosure, consider a scenario in which a user having a primary account (e.g., a primary user) with an authorization entity wishes to generate a secondary account to be used by another party (e.g., a secondary user). In this example, an employer may wish to create a secondary payment account that can be used by a temporary employee (e.g., a contractor). In addition, the primary user may wish to associate the secondary account with a particular project or protocols. In this example, the primary user, who may be acting on behalf of a business entity, may provide identification information to the authorization entity server 108 and/or the service provider server 110(A) for the secondary user. The provided identification information may include an indication of a communication channel or a device identifier that may be used to contact the secondary user. In some cases, the primary user may indicate a type of project or specific protocols to be associated with the secondary user. Once the secondary account has been established, an identifier for that secondary account (e.g., a token) may be provided to the secondary user via the indicated communication channel. In some embodiments, the primary user and/or the secondary user may then provide an itinerary which may be associated with the project or the secondary user. Additionally, the primary user may select one or more protocols to be applied to the secondary account.

Continuing with the above example, the secondary user may receive the identifier for the second account (e.g., the token) on his or her client device 102. Upon receiving the token, the secondary user may wish to complete a purchase related to the project to which the secondary user has been assigned. In this example, the secondary user may approach a resource provider and may, upon initiating a transaction with that resource provider, provide the token for the secondary account to the resource provider server 106 to complete the transaction (e.g., via the transaction application 112). The resource provider server 106 may then generate an authorization request message to be provided to the transaction processing platform 110 for authorization. In this example, the authorization request message may be received by the service provider server 110(A), which may consult the provided itinerary and dynamically generate a set of protocols for the secondary account. The service provider server 110 may then determine whether the requested transaction is in compliance with the dynamically-generated set of protocols and may either provide authorization for services for the transaction or forward the generated set of protocols to the authorization entity along with the authorization request message. If approved, the transaction may then be completed using the primary account while being associated with the secondary account. In this way, the secondary user is able to purchase project-related materials without financial liability.

Figure 2:
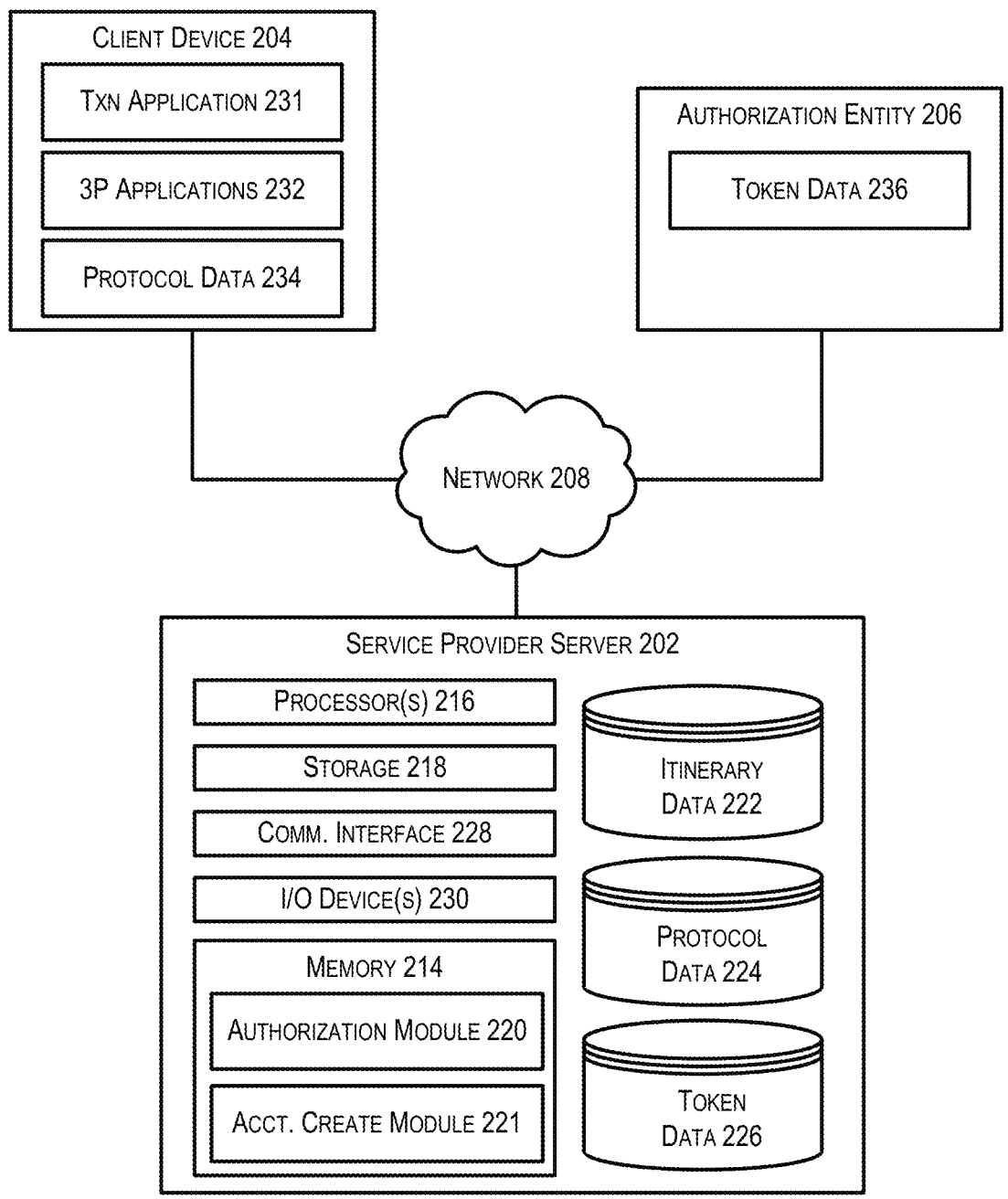
FIG. 2 depicts an example system architecture that may be implemented to project-based secondary account management in accordance with embodiments of the disclosure.

FIG. 2 depicts an example system architecture that may be implemented to project-based secondary account management in accordance with embodiments of the disclosure. In FIG. 2, a service provider server 202 may be in communication with a number of client devices 204 and authorization entity servers 206 via a network connection 208. The network connection 208 may include at least a transaction processing network. In some embodiments, the service provider server 202 may be an example service provider server 110(A) of FIG. 1.

In at least some embodiments, the service provider server 202 may include at least one memory 214 and one or more processing units (or processor(s)) 216. The processor(s) 216 may be implemented as appropriate in hardware, computer-executable instructions, firmware or combinations thereof. Computer-executable instruction or firmware embodiments of the processor(s) 216 may include computer-executable or machine executable instructions written in any suitable programming language to perform the various functions described.

The memory 214 may store program instructions that are loadable and executable on the processor(s) 216, as well as data generated during the execution of these programs. Depending on the configuration and type of service provider server 202, the memory 214 may be volatile (such as random access memory (RAM)) and/or non-volatile (such as read-only memory (ROM), flash memory, etc.). The service provider server 202 may also include additional storage 218, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the service provider server 202. In some embodiments, the memory 214 may include multiple different types of memory, such as static random access memory (SRAM), dynamic random access memory (DRAM) or ROM.

Turning to the contents of the memory 214 in more detail, the memory 214 may include an operating system and one or more application programs or services for implementing the features disclosed herein including at least a module for dynamically generating a set of protocols for a transaction and determining whether to authorize the transaction based on the dynamically-generated set of protocols (authorization module 220) and a module for generating and binding secondary accounts to primary accounts (account creation module 221). The memory 214 may also include itinerary data 222, which provides data stored in association with an expected itinerary for a user and/or project, protocol data 224, which provides at least a list of protocols stored in association with various conditions, and/or token data 220, which provides a mapping between a generated token and a transaction or account (e.g., between a secondary account and a primary account). Additionally, the service provider server 202 may include any number of modules for enabling additional functionality, such as the functionality described later herein.

In some embodiments, the authorization module 220 may, in conjunction with the processor 216, be configured to identify a set of protocols to be applied to a particular transaction. For example, upon receiving an indication of a transaction via an authorization response message, the authorization module 220 may consult itinerary data 222 to determine a current status of a secondary account associated with the transaction. The authorization module 220 may then identify each of the protocols from protocol data 224 to be applied to the transaction based on the determined current status. In some embodiments, one or more protocols may be universal (e.g., static) to a particular secondary account, primary account associated with the secondary account, user, project, or any other suitable basis. In these embodiments, the set of protocols may be dynamically generated to include each of the universal protocols as well as any protocols which are relevant to a current status of the secondary account. In some embodiments, one or more protocols may conflict. In these embodiments, a protocol may be selected from conflicting protocols based on a priority level of the protocols.

Once a set of protocols has been generated for a transaction in this manner, the authorization module 220 may determine whether the transaction is in compliance with that set of protocols. In some embodiments, the authorization module 220 may be configured to approve or decline the transaction based on whether the transaction is in compliance with the generated set of protocols. In some embodiments, the generated set of protocols may be provided to an authorization entity 206 along with the authorization request message to enable that authorization entity 206 to approve or decline the transaction.

In some embodiments, the account creation module 221 may, in conjunction with the processor 216, be configured to generate a secondary account to be associated with a primary account (PAN). In some embodiments, this may entail identifying a number of details related to the use of the secondary account to be generated. In some embodiments, the secondary account may be generated for a particular person or entity. The secondary account may be associated with a total amount and/or expiration date. In some embodiments, a primary user may provide an indication of one or more protocols as well as an indication of conditions under which protocol is relevant. In some embodiments, a user may provide itinerary data to be associated with the secondary account. The itinerary may outline dates and times at which certain conditions will be met and may be used by the authorization module 220 to dynamically generate a set of protocols.

The service provider server 202 may also contain communications interface(s) 228 that enable the service provider server 202 to communicate with a stored database, another computing device or server, one or more remote devices, other application servers, and/or any other suitable electronic devices. In some embodiments, the communication interface 228 may enable the service provider server 202 to communicate with other electronic devices on a network (e.g., on a private network). The service provider server 202 may also include input/output (I/O) device(s) and/or ports 230, such as for enabling connection with a keyboard, a mouse, a pen, a voice input device, a touch input device, a display, speakers, a printer, etc.

The client device 204 may be any electronic device capable of communicating with other electronic devices. For example, the client device 204 may be a mobile phone capable of wirelessly communicating with a number of other electronic devices. In some embodiments, the client device 204 may be an example of client device 102 depicted in FIG. 1. The client device 204 may have installed upon it a number of software modules, including a transaction application 231 and one or more 3P applications 232. In some embodiments, the client device may also include, in its memory, protocol data 234. In some embodiments, the transaction application 231 may include computer executable instructions that cause the client device 204 to perform at least a portion of the functionality described herein. For example, in some embodiments, the transaction application 231 of the client device 204 may be configured to provide a token associated with a secondary account to another application or electronic device in order to complete a transaction. In some embodiments, the transaction application 231 may also be configured to communicate with the service provider server 202 to enable a user of the client device 204 to perform at least a portion of the functionality described herein.

In some embodiments, a 3P application 232 may be a mobile application installed upon, and executed from, the client device 204. In accordance with at least some embodiments, the 3P application 232 may be configured to manage access to a resource maintained by a third party. The transaction application 231 of the client device 204 may be configured to interact with one or more 3P applications 232 in order to obtain access to the managed resource. In some embodiments, the client device 204 may store a token generated by the service provider server 202 described above, which may be provided to one or more 3P applications 232 via the transaction application 231. However, it should be noted that the client device need not be provided the token in at least some embodiments. For example, one or more 3P applications 232 may be provided a secondary account number which may be used to complete a transaction. In some embodiments, the provided secondary account number may be stored by a remote application server that supports the 3P application with respect to a user of the client device 204. For example, the remote application server that supports a 3P application may store the secondary account number in an account maintained with respect to that user.

In some embodiments, the authorization entity 206 may be an example of authorization entity server 106 depicted in FIG. 1, which may be configured to determine whether a particular transaction should be authorized. The authorization entity 206 may maintain a number of accounts, at least one of which may be a primary account and a number of which may be secondary accounts linked to the primary account. In some embodiments, one or more of a primary account or secondary account may be associated with a client device 204. In some embodiments, the authorization entity 206 may maintain a number of tokens 236 which are mapped to accounts that are maintained by the authorization entity. It should be noted that in some embodiments, the authorization entity 206 may not store token data 236 (e.g., the data may be stored on the service provider server 202).

Figure 3:
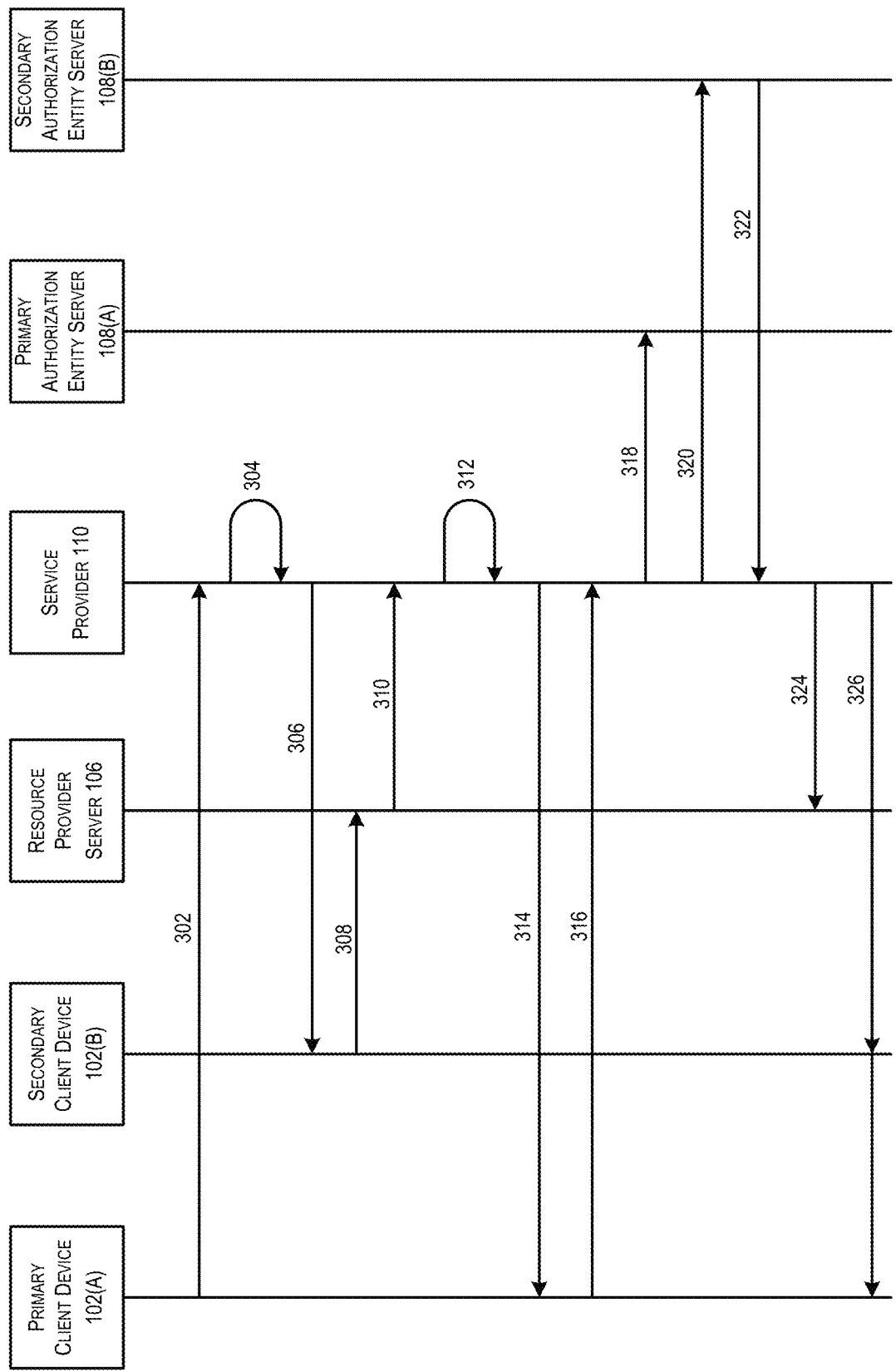
FIG. 3 depicts a swim lane diagram illustrating a process by which a secondary account may be generated and used in accordance with at least some embodiments.

FIG. 3 depicts a swim lane diagram illustrating a process by which a secondary account may be generated and used in accordance with at least some embodiments. In FIG. 3, a number of client devices 102 (A and B) may be in communication with a resource provider 106 and/or a service provider 110. The service provider 110 may, in turn, be in communication with a number of authorization entities 108 (A and B). In this swim lane diagram, the client devices 102 may include a primary client device 102(A) which may be operated by a primary user and a secondary client device 102 (B) which may be operated by a secondary user. Additionally, the authorization entity servers 108 may include a primary authorization entity server 108 (A) that maintains a primary account associated with the primary user and a secondary authorization entity server 108 (B) that maintains a primary account associated with the secondary user.

In some embodiments, the process may begin when a request to generate a secondary account is received by the service provider server 106 from a primary client device 102(A) at 302. The request may be generated by a primary user wishing to generate a secondary account for a secondary user. In some embodiments, the request may be generated by the primary user logging into an account maintained by the service provider with respect to the primary user. In some embodiments, the request may include an indication of a primary account number (PAN) associated with a primary user which is maintained by a primary authorization entity server 108(A). In some embodiments, the server provider server 106 may maintain an identifier for the PAN associated with the primary client device. In some embodiments, the request may also include an itinerary document that indicates one or more statuses and time periods during which those statuses are applicable to the secondary account. The request may also include an indication of a time period during which the secondary account will be valid. In some embodiments, the request may also include an indication of an identifier for the secondary client device 102(B). For example, the request may include an indication of a phone number or other suitable device identifier.

Once the request is received, the service provider may generate a token or other identifier to be associated with the secondary account at 304. In some embodiments, one or more protocols may be selected to be associated with the secondary account. In some embodiments, one or more protocols may be included in the received request. In some embodiments, one or more protocols may be selected based on a type or category associated with the secondary account to be generated. For example, upon receiving a request for a secondary account to be generated in relation to a particular project, the service provider may identify a number of protocols which are relevant to the type of project that the secondary account is being created for. In some embodiments, at least a portion of these selected protocols may be static, in that they will be relevant to each transaction conducted using the secondary account. In some embodiments, the token generated for the secondary account may be stored in a token vault with a relationship to the PAN associated with the primary client device.

In some embodiments, once a secondary account has been generated, the service provider 110 may transmit an identifier for the secondary account (e.g., the token) to the secondary client device 102(B) at 306. In some embodiments, this may involve transmitting the secondary account identifier to the secondary client device 102(B) using a device identifier received in the request to generated the secondary account. In some embodiments, the secondary client device 102(B) may communicate with the service provider using a mobile application installed on that client device (e.g., transaction application 112 depicted in FIG. 1). In these embodiments, the secondary account identifier may be provided to the client device 102(B) via that communication. For example, a secondary user may use a mobile application to log into an account maintained by the service provider on behalf of the secondary user. In some embodiments, the secondary user may be associated with a second PAN which is maintained by a secondary authorization entity server 108(B).

In some embodiments, the secondary user may choose to use the secondary account to complete a transaction with a resource provider at 308. In these embodiments, the secondary client device 102(B) may provide the secondary account identifier to the resource provider server 106 associated with the resource provider to be used in completing the transaction. The resource provider server 106 may then, in relation to the transaction to be completed, generate an authorization request message to be transmitted to a transaction processing platform which may be received by the service provider at 310.

Upon receiving the authorization request message, the service provider 110 may dynamically generate a set of protocols to be associated with the requested transaction at 312. In some embodiments, the service provider 110 may identify an itinerary which may be stored in association with the secondary account. To do this, the service provider 110 may identify one or more statuses of the secondary account based on that itinerary and may generate a set of protocols relevant to the determined statuses. In some embodiments, one or more statuses may be relevant to the secondary account during any given period of time. In the above example, the service provider may identify the statuses relevant to the secondary account at the time of the transaction. In some embodiments, one or more of the protocols may require authorization by a primary user. In these embodiments, the service provider 110 may transmit a request for authorization to the primary client device 102(A) at 314 and may subsequently receive a response at 316.

In some embodiments, once a set of protocols has been generated, the service provider 110 may determine whether to approve or decline the transaction based on whether that transaction is in compliance the generated set of protocols. In some embodiments, the service provider 110 may forward the set of protocols along with the authorization request message to the primary authorization entity server 108(A) for authorization of the transaction at 318. In some embodiments, at least a portion of an amount associated with the transaction may not be in compliance with the set of protocols. For example, the transaction may be of a type that is not allowed or an amount associated with the transaction may exceed some limit indicated in a protocol. In some cases, the transaction may be declined in the event that an amount associated with the transaction is not in compliance with the set of protocols. In some cases, the amount associated with the transaction which is not in compliance the set of protocols may be charged to the PAN associated with the secondary user by generating an authorization request message to be transmitted to a secondary authorization entity server 108(B) at 320. For example, if a transaction is requested for $75.00 which is associated with a $50.00 maximum limit, then the service provider, upon determining that the transaction is over the limit, the service provider 110 may generate a second authorization request message for $50.00 to be transmitted to the primary authorization entity server 108(A) and may generate a third authorization request for the remaining balance of the transaction ($25.00) to be transmitted to the secondary authorization entity server 108(B). It should be noted that, in this example, the primary authorization entity server 108(A) and the secondary authorization entity server 108(B) may be the same server (e.g., in the case that both the primary user and the secondary user maintain accounts with the same authorization entity).

In some embodiments, the service provider 110 may receive one or more authorization response messages at 322. In some embodiments, the service provider 110 may receive authorization response messages from both the primary authorization entity server 108(A) and the secondary authorization entity server 108(B) indicating authorization statuses for their respective portions of the transaction. In some embodiments, the service provider 110 may decline the transaction if any of the received authorization response messages indicates that the transaction is declined. The service provider may convey the authorization status of the transaction to the resource provider server 106 at 324 to enable the transaction to be completed. In some embodiments, information related to the transaction may be forwarded to the primary client device 102(A) and/or the secondary client device 102(B) at 326.

Figure 4:
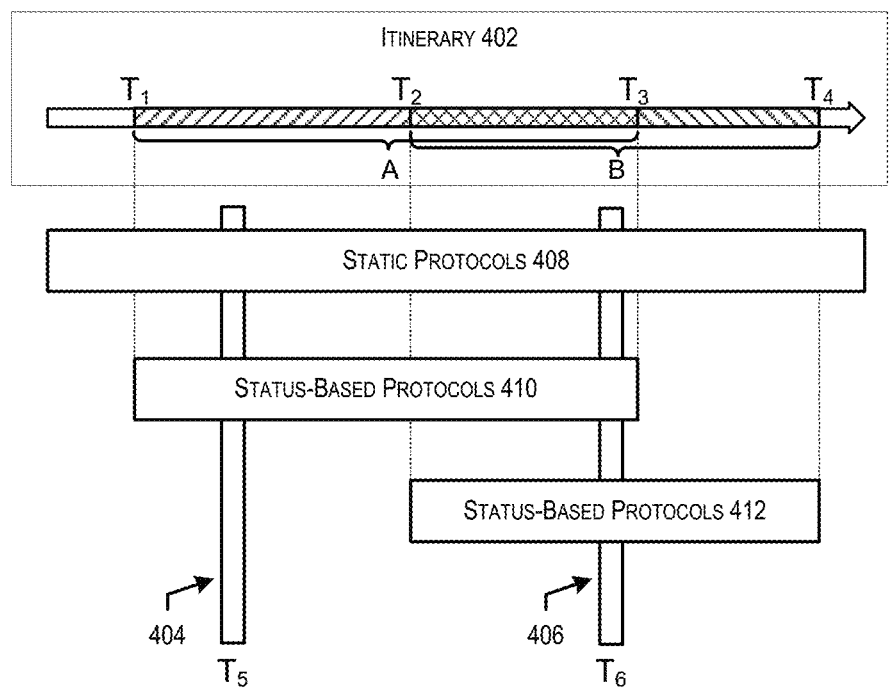
FIG. 4 depicts an illustrative example of an itinerary that may be used to dynamically generate a set of protocols to be applied to a transaction in accordance with at least some embodiments.

FIG. 4 depicts an illustrative example of an itinerary that may be used to dynamically generate a set of protocols to be applied to a transaction in accordance with at least some embodiments. In particular, itinerary 402 may include an indication of one or more statuses to be associated with a secondary account with respect to time. For example, the itinerary 402 depicts, as examples, Status A and Status B. In FIG. 4, Status A (depicted as "A") is illustrated as beginning at time $T_1$ and ending at time $T_3$. and Status B (depicted as "B") is illustrated as beginning at time $T_2$ and ending at time $T_4$.

For the purposes of illustration, consider a scenario in which two separate transactions are conducted during a time period associated with the itinerary 402, and more particularly during the time period between time $T_1$ and time $T_4$. For example, consider a first transaction 404 conducted at time $T_5$ and a second transaction 406 conducted at time $T_6$.

In the above illustrative example, upon receiving details of transaction 404, the itinerary 402 may be consulted to generate a set of protocols to be applied to that transaction. In some embodiments, a number of static protocols 408 may be identified. Static protocols 408 may include protocols which are specific to the itinerary, a project associated with the itinerary, a secondary user, a primary user, or any other suitable criteria. Hence, static protocols 408 may be protocols which are always relevant to transactions conducted using a particular secondary account. Additionally, the itinerary may be used to identify a set of status-based protocols 410. To do this, a service provider may consult the itinerary at time $T_5$ to determine that the account is affected by status A. The service provider may then determine that status-based protocols 410 are associated with status A. In this example, the service provider may dynamically generate a set of protocols that include protocols 408 and protocols 410 (e.g., {408, 410}) to be applied to the transaction 404.

In the above illustrative example, upon receiving details of transaction 406, the itinerary 402 may be consulted to generate a set of protocols to be applied to that transaction in a manner similar to that described with respect to transaction 404 above. However, in addition to determining that the account is affected by status A at time $T_6$, the service provider may determine that the account is also affected by status B. In this example, the service provider may dynamically generate a set of protocols that include protocols 408, protocols 410, and protocols 412 (e.g., {408, 410, 412}) to be applied to the transaction 404, where status-based protocols 412 are determined to be associated with status B.

It should be noted that in some embodiments, the set of protocols may include protocols which conflict. In some cases, each protocol may be associated with a priority which may be used to determine which of the two protocols should take precedence. In some embodiments, a transaction must comply with each of the protocols (or subsets of protocols) within the dynamically-generated set of protocols in order to be "successful." In some embodiments, a transaction must comply with one or more of the protocols (or subsets of protocols) within the dynamically-generated set of protocols in order to be "successful." For example, in the depicted FIG. 4, the transaction 406 may be required to comply with each of the static protocols 408 as well as either protocols 410 or protocols 412. In this example, the transaction $T_6$ may be considered as successfully complying with the protocols if it is in compliance with either protocols 410 or protocols 412. As noted elsewhere, one or more of protocols 408, 410, and 412 may include a failure action which indicates an action to be taken if the transaction is not found to be in compliance with that set of protocols. For example, in some cases a failure action may cause the transaction to be declined. In another example, a failure action may cause the transaction to be billed to a different account or redirected to a different authorization entity.

Figure 5:
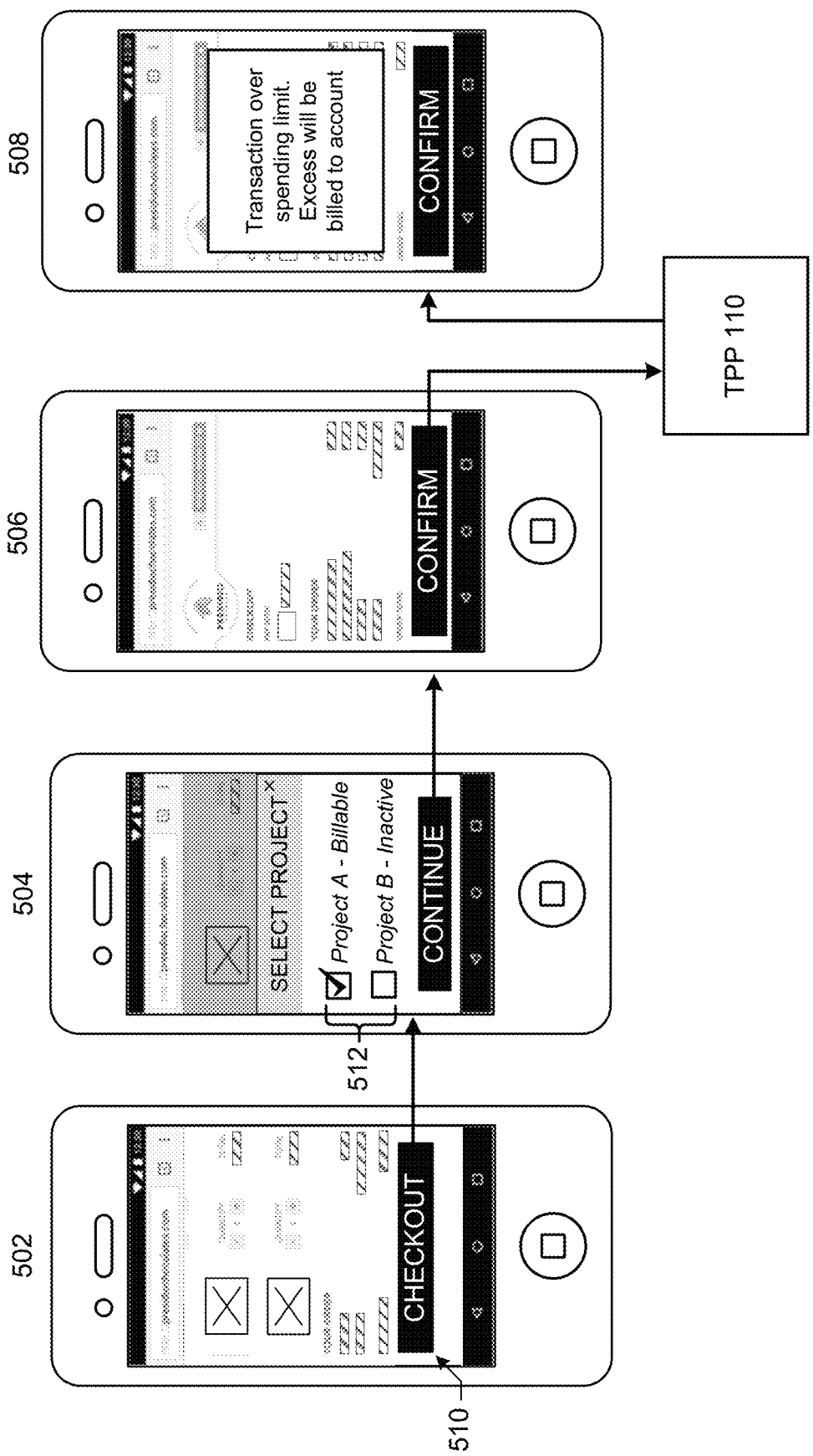
FIG. 5 depicts an illustrative example of a first secondary user interaction that may occur in accordance with at least some embodiments.

FIG. 5 depicts an illustrative example of a first secondary user interaction that may occur in accordance with at least some embodiments. In FIG. 5, the interaction is depicted via a series of graphical user interfaces (GUIs) 502, 504, 506, and 508 implemented on a client device.

As depicted in GUI 502, at least a portion of the functionality described herein may be integrated with a checkout element 510 of a separate mobile application. For example, the functionality may be implemented via a checkout element 510 rendered within a browser application, the functionality may be implemented via a checkout element 510 rendered within a mobile application that manages access to a resource, or the functionality may be implemented via a checkout element 510 rendered within a payment application (e.g., a mobile application used to complete payments at a physical location).

In some embodiments, as depicted in GUI 504, a secondary user may be provided with the ability to select a particular secondary account upon selection of the checkout element 510. In some embodiments, the secondary user may be presented with a list of secondary accounts 512, from which the secondary user may be provided the ability to make a selection. In some embodiments, each of the secondary accounts in the list of secondary accounts 512 may be associated with different projects and/or primary users (e.g., business entities).

In some embodiments, as depicted in GUI 506, once the secondary user has selected a secondary account form list 512, the secondary account number may be provided to the mobile application to complete the transaction and the secondary user may be provided with the ability to confirm payment details for the transaction. It should be noted that this functionality may be provided by the separate mobile application with which embodiments of the disclosure are integrated. In some embodiments, once the secondary user has confirmed the transaction details, it may be determined whether the requested transaction is in compliance with a set of protocols. In some embodiments, the transaction details may be compared to protocols stored on the client device before the transaction is initiated. In some embodiments, an authorization request message may be generated and transmitted to a transaction processing platform 110, which may subsequently determine whether the transaction is in compliance with a set of protocols.

If the transaction is determined to be in compliance with the various protocols in the set of protocols, then the transaction details may be transmitted to the authorization entity server for authorization. In some embodiments, if the transaction is not in compliance with one or more protocols, then a failure action may be taken. For example, upon determining that the transaction is for an amount that exceeds a transaction limit associated with an applicable protocol, the failure action for that protocol may indicate that the excess is to be billed to the secondary user's account. In this example, the secondary user may be notified as depicted in GUI 508. In some embodiments, the transaction processing platform 110 may then generate two new authorization request messages. One authorization request message may be generated for the transaction limit associated with the applicable protocol, which may be routed to the authorization entity server associated with the selected secondary account. A second authorization request message may be generated for any amount in excess of the transaction limit associated with the applicable protocol, which may be routed to a second authorization entity server associated with a primary account of the secondary user. In some embodiments, the transaction may be declined if either of the two separate authorization request messages is declined.

Figure 6:
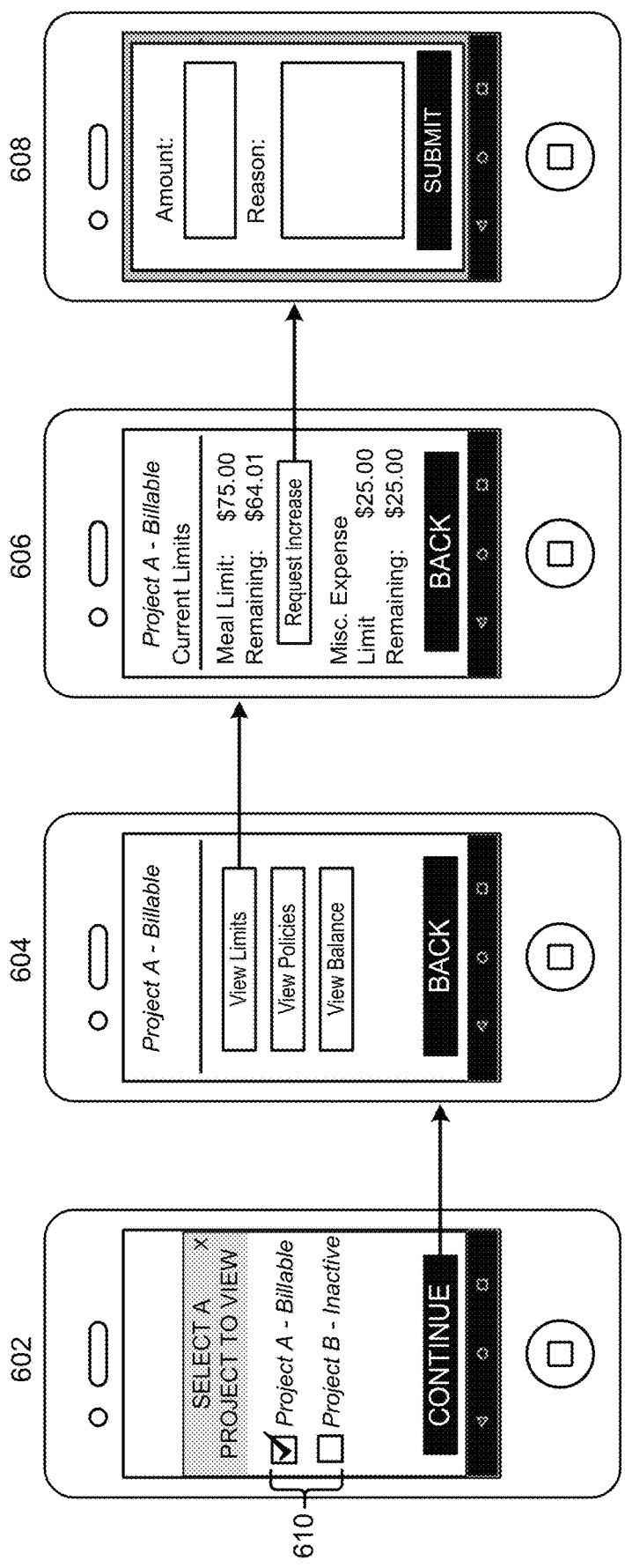
FIG. 6 depicts an illustrative example of a second secondary user interaction that may occur in accordance with at least some embodiments.

FIG. 6 depicts an illustrative example of a second secondary user interaction that may occur in accordance with at least some embodiments. In FIG. 6, the interaction is depicted via a series of graphical user interfaces (GUIs) 602, 604, 606, and 608 implemented on a client device. In particular, FIG. 6 depicts an interaction in which a secondary user is provided the ability to view protocols and rules associated with one or more secondary accounts.

In GUI 602, the secondary user may be presented with the ability to view and select a secondary account. For example the secondary user may be provided with a list 610 that includes one or more secondary accounts associated with that secondary user. In this example, the secondary user may be provided with the ability to select a particular secondary account in order to view details associated with that secondary account. Upon selecting a secondary account from the list 610, the secondary user may be presented with a number of options related to the account as depicted in GUI 604.

Upon selection of an account option, the secondary user may be provided with a number of details related to that secondary account in accordance with the user's selection. In some embodiments, the information provided may be dynamically updated in a manner similar to that described with respect to processing a transaction. For example, a service provider (or the client device itself) may identify a number of protocols relevant to the option selected by the secondary user. The protocols may then be compiled into a set of protocols and information from that set of protocols may be parsed to be presented to the secondary user via GUI 606. Accordingly, the secondary user may be presented with information that pertains to the current status of the selected secondary account.

In some embodiments, the secondary user may be provided with the ability to request an adjustment to one or more protocols. For example, the user may request an increase in a spending limit or an extension of some specific status. In some embodiments, the itinerary document from which a status of the secondary account is obtained may also include supervisor information. In some embodiments, the supervisor information may vary with time within the itinerary document. For example, the secondary account may be associated with a nighttime supervisor which is different from a daytime supervisor associated with the secondary account. In some embodiments, the itinerary document may include a communication channel through which the current supervisor may be contacted for authorization. In these embodiments, the supervisor may be contacted via the provided communication channel and may approve or decline the request.

Figure 7:
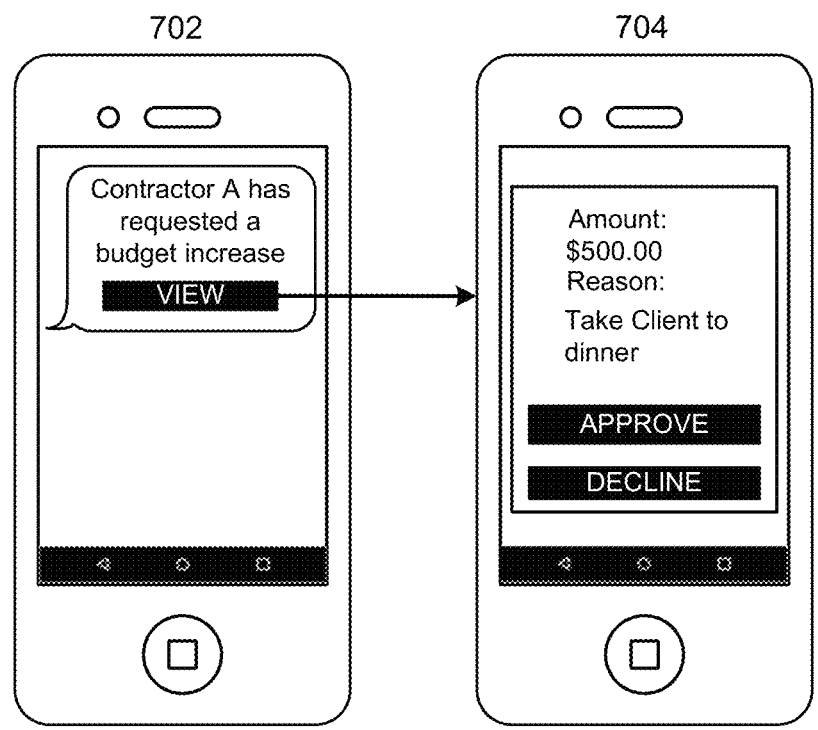
FIG. 7 depicts an illustrative example of a first primary user interaction that may occur in accordance with at least some embodiments.

FIG. 7 depicts an illustrative example of a first primary user interaction that may occur in accordance with at least some embodiments. As depicted in FIG. 7, a primary user may be provided with a notification regarding a request made by a secondary user. In some embodiments, an itinerary associated with a secondary account may include an indication of a primary user as well as a communication channel which may be used to contact the primary user. In some embodiments, a different primary user may be associated with different periods of time, such that when a secondary user generates a request, the service provider identifies the current primary user and transmits the request to that primary user.

A generated request may be transmitted to the primary user in a number of manners. In some embodiments, as depicted in GUI 702, a generated request may be transmitted to a client device operated by the primary user via a short messaging service (SMS). As depicted in GUI 704, the primary user may be provided with the option to approve or decline the request via a response to the request.

Figure 8:
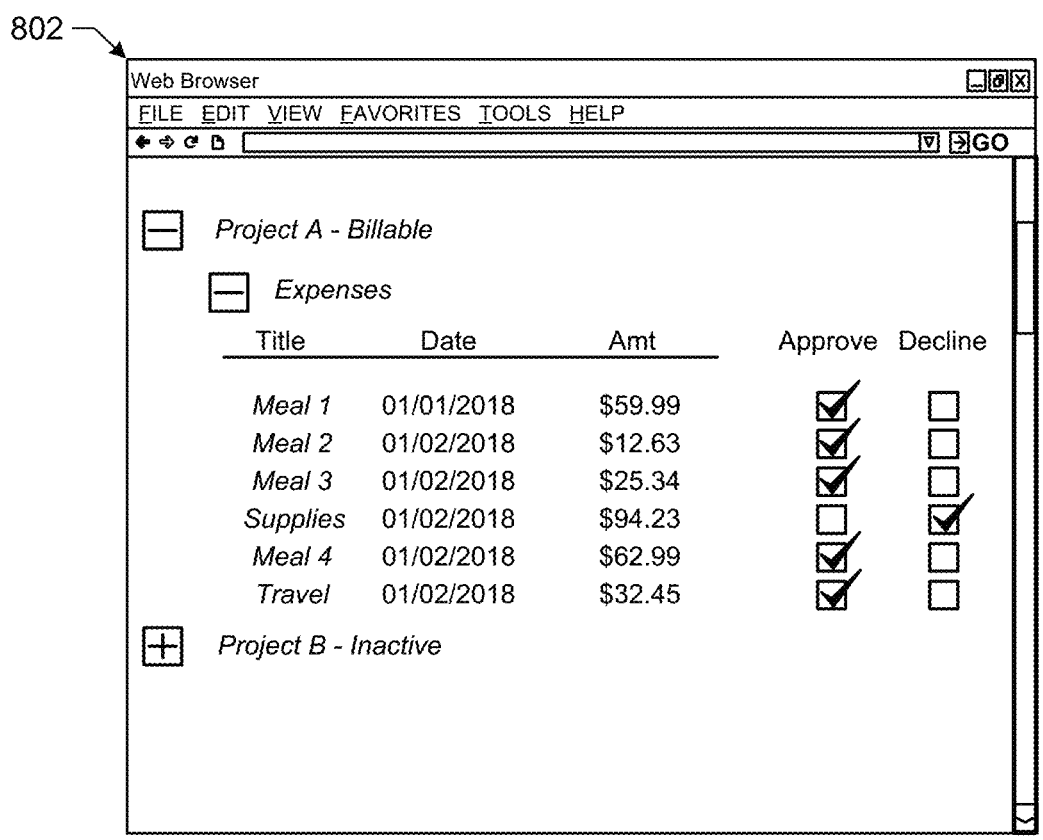
FIG. 8 depicts an illustrative example of a second primary user interaction that may occur in accordance with at least some embodiments.

FIG. 8 depicts an illustrative example of a second primary user interaction that may occur in accordance with at least some embodiments. In FIG. 8, a GUI 802 associated with a web browser is depicted. In some embodiments, GUI 802 may be accessed by logging into an account maintained by a service provider with respect to a primary user.

As depicted in FIG. 8, a primary user may be given the ability to manually approve or decline various transactions conducted using a secondary account in accordance with at least some embodiments. It should be noted that the transactions depicted may already have been completed using the secondary account when GUI 702 is accessed. Accordingly, each of the transactions may represent a transaction in which a PAN associated with the primary user has been charged for the listed expense.

In this scenario, the primary user may select to decline one or more of the previously-completed transactions. In some embodiments, upon receiving an indication that a particular transaction should be declined, the service provider may identify a PAN associated with the secondary user that completed the transaction using the secondary account. Once identified, the service provider 110 may generate an authorization request message to initiate a transaction for the declined amount using the PAN associated with the secondary user, which may then be routed to an authorization entity server associated with that PAN. In these embodiments, the authorization entity associated with the primary user may be treated as the resource provider in the transaction. In some embodiments, an amount associated with declined transactions may simply be tracked so that the total amount of the declined transactions can be deducted from a total amount due to the secondary user for his or her services.

Figure 9:
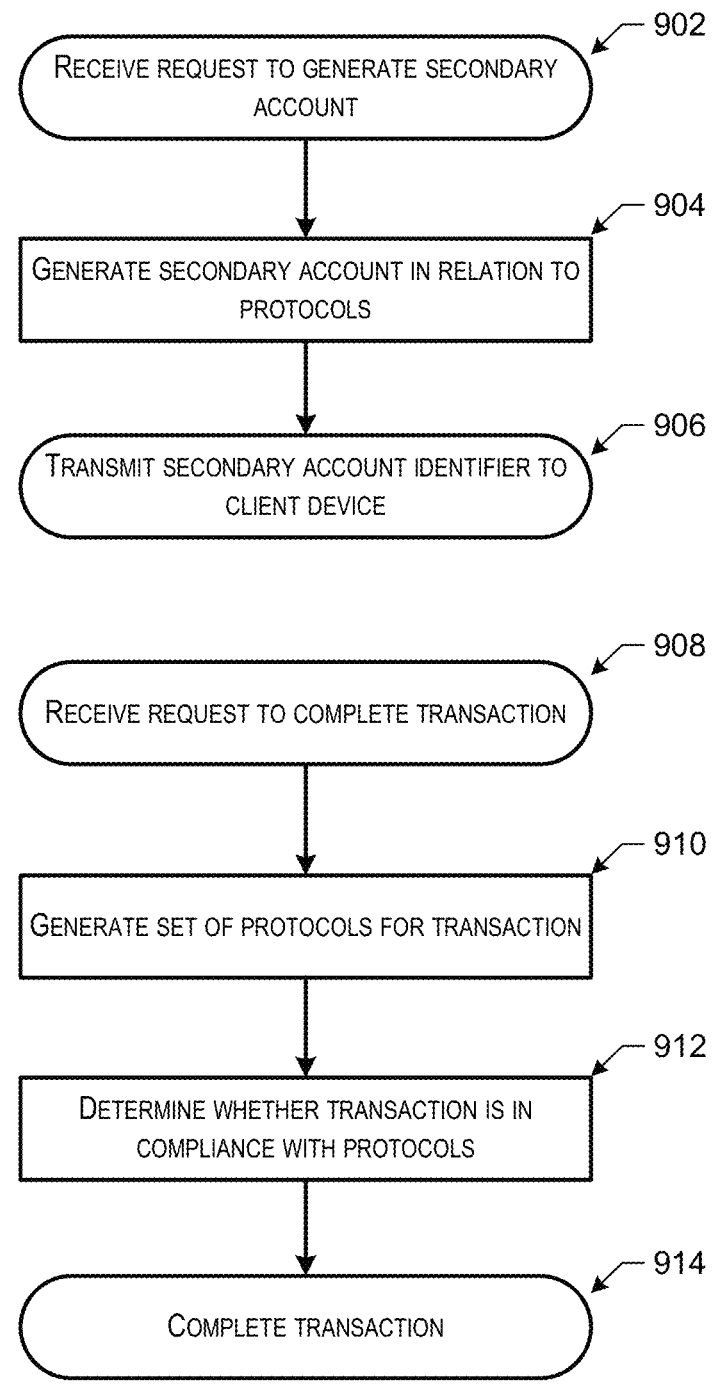
FIG. 9 depicts a flow diagram illustrating a process for providing dynamic authorization of a secondary account in accordance with at least some embodiments.

FIG. 9 depicts a flow diagram illustrating a process for providing dynamic authorization of a secondary account in accordance with at least some embodiments. In some embodiments, the process 900 may be performed by a service provider server, such as the service provider server 202 described with respect to FIG. 2 above.

In some embodiments, process 900 may begin at 902, when a request is received to generate a secondary account associated with a primary account. In some embodiments, the request may include an itinerary associated with the secondary account that indicates one or more statuses associated with the secondary account during specified periods of time. The request to generate the secondary account in relation to the primary account may be received from a primary user associated with the primary account.

At 904, the process may involve generating the requested secondary account and identifying a number of protocols to be associated with that secondary account. At 906, the process may involve transmitting an identifier for the secondary account to a client device associated with the secondary user intended to own the secondary account. In some embodiments, the identifier for the secondary account may be a token or other suitable account identifier.

At 908, the process may involve receiving a request to complete a transaction that includes the identifier for the secondary account. The request to complete the transaction may be received from a resource provider. For example, the resource provider may be one that maintains a physical store location and the identifier for the secondary account may be received via a digital wallet application installed upon the client device.

At 910, the process may involve dynamically generating a set of protocols specific to the requested transaction. In some embodiments, this may involve generating the set of protocols based on the one or more statuses associated with the secondary account at the time that the request to complete the transaction is received. For example, each status may be associated with a different set of protocols such that a cumulative set of protocols may be generated that includes all of the protocols in each of the different set of protocols for each of the statuses identified as being relevant to the secondary account at the time of the transaction.

At 912, the process may involve determining whether the transaction is in compliance with the dynamically generated set of protocols. In some embodiments, this may involve identifying one or more threshold values associated with the set of protocols and determining whether the transaction is above or below the one or more threshold values. For example, the set of protocols may include an indication of a transaction category and a currency threshold to be associated with that transaction threshold. By way of illustration, a protocol may indicate that meal transactions should not exceed $75.00. In this illustrative example, a transaction conducted at a restaurant would not be in compliance with this protocol if the transaction was for an amount greater than $75.00.

At 914, the process may involve completing the requested transaction. In some embodiments, this may involve upon determining that the transaction is in compliance with each of the protocols in the set of protocols, transmitting the request to complete the transaction to an authorization entity associated with the primary account. One or more protocols in the set of protocols may include an indication of a failure action to be taken upon determining that the transaction is not in compliance with that protocol. In some embodiments, this may involve upon determining that the transaction is not in compliance with one or more protocols in the set of protocols, declining the transaction. In some embodiments, this may involve upon determining that the transaction is not in compliance with one or more protocols in the set of protocols, completing the transaction using the primary account and a second primary account. Completing the transaction using the primary account and a second primary account may further involve generating a first authorization request message for a first portion of the transaction to be routed to a first authorization entity associated with the primary account, and generating a second authorization request message for a remaining portion of the transaction to be routed to a second authorization entity associated with the second primary account. In these embodiments, the second primary account may be a primary account belonging to a secondary user, which is a user of the client device associated with the secondary account.

The application described above can be temporary (e.g., the lifetime of the contractor's employment with an employer) and can have a number of useful functions. A contractor can use the application to (a) receive access data (which can be used to make purchases and/or access funds associated with an account), (b) receive and operate an itinerary from his or her employer, and (c) top up of an account by sending a message to the employer, who can notify a bank to raise a credit limit or funds in the account.

The access data may also include access data including a commercial credit card BIN which allows an employer to move money up and down, depending upon the engagement of the contractor. In some embodiments, there is no escheatment. If a contractor does not use up all of the funds associated with the access data, then the funds will revert back to the employer. This is different than a prepaid card, where the escheatment may go back to the issuer. Embodiments of the disclosure allow the contractor to adjust the option to buy in a much faster and more convenient manner.

Embodiments of the disclosure can also use access data with commercial card BINs. Such BINs can be associated with "level 3 data" which is data that is specific to the transactions being conducted (e.g., what type of seats were purchased on an airline, was dinner purchased at a specific hotel, etc.). Such information can be automatically provided to an employer as part of the transaction being conducted by the contractor. This makes the expense management process easier for employers and less cumbersome for the contractor. In addition to such data, a contractor can capture receipt data from receipts and this data can be added to an expense management report by the application.

Embodiments of the disclosure solve the problem of a contractor using personal funds when asked to travel, and also solves the problem of an issuer and/or company issuing a corporate travel card to a non-employee. Embodiments of the disclosure instead issue a digitally provisioned PAN/token to the contractor's device. Issuer controls may be applied to the PAN/token. Embodiments of the disclosure create a unique experience where the "boss" can adjust credit limits and other controls on the card. Embodiments of the disclosure also create a seamless experience using an expense management system of the company by enabling a temporary employee to purchase goods without being out of pocket.

Embodiments of the disclosure provide for a number of technical advantages over conventional systems. For example, embodiments of the system enable a secondary user to use a single token to complete transactions for which each portion of the transaction is automatically billed to its appropriate account. For example, the secondary user can use the token to complete a transaction and may have confidence that the portion of the transaction which she is authorized to bill to the primary account will be billed to the primary account and that she will only be billed for the portion of the transaction which she is not authorized to bill to the primary account. In this way, the system uses specific rules to generate and route different authorization amounts to their appropriate entities. This, in turn, eliminates the need for the secondary user to assume financial liability by being "out of pocket" for a project which she is completing for a client company.

Additionally, the system is able to dynamically adjust credit limits for a secondary account based on itinerary data. This allows a company to better manage its contractors to prevent abuse while also providing sufficient freedom to complete projects. In the system, credit limits can be increased automatically when the company anticipates a large amount of spending is required and may scale back those limits when a small amount of spending is anticipated. It should be noted that the application implemented in embodiments of the disclosure can be used with many different companies, and each company need not provide its own expense reporting infrastructure for its contractors.

In yet other embodiments, embodiments of the disclosure can provide payroll services to a contractor through the application. A system such as Visa Direct can push payroll funds to the account associated with the access data, or another set of access data managed by the application.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad disclosure, and that this disclosure is not to be limited to the specific arrangements and constructions shown and described, since various other modifications may occur to those with ordinary skill in the art.

As used herein, the use of "a", "an" or "the" is intended to mean "at least one," unless specifically indicated to the contrary.

What is claimed is:

1. A method, comprising:
   receiving, by a service provider, a request to generate a secondary account in relation to a primary account associated with a first entity;
   generating the secondary account in association with a number of protocols, the number of protocols indicating transactions that can be authorized at a particular status associated with the secondary account;
   receiving an itinerary associated with the secondary account, the itinerary indicating a plurality of statuses associated with the secondary account during specified periods of time;
   maintaining the primary account to be valid and the secondary account to be invalid outside the specified periods of time as indicated in the itinerary;
   transmitting an identifier for the secondary account to a client device of a second entity associated with the secondary account;
   upon receiving a request to complete a transaction that includes the identifier for the secondary account, generating a set of protocols from the number of protocols based on one or more of the plurality of statuses associated with the secondary account at a time that the request to complete the transaction is received;
   determining that a first portion of the transaction is in compliance with the set of protocols and that a second portion of the transaction is not in compliance with the set of protocols based upon at least whether the transaction is of a transaction type that can be completed at a time of the transaction;
   receiving a request to adjust at least one of the number of protocols from the second entity;
   dynamically adjusting at least one of the number of protocols associated with the secondary account upon approval from the first entity; and
   completing the transaction by:
      processing the first portion of the transaction using the primary account associated with the first entity,
      processing a first amount of the second portion of the transaction that is in compliance with adjusted number of protocols using the primary account associated with the first entity, and
      processing a second amount of the second portion of the transaction that is not in compliance with adjusted number of protocols using a third account associated with the second entity.

2. The method of claim 1, further comprises:
   generating a first authorization request message for the first portion and the first amount of the second portion of the transaction to be routed to a first authorization entity associated with the primary account associated with the first entity; and
   generating a second authorization request message for the second amount of the second portion of the transaction to be routed to a second authorization entity associated with third account associated with the second entity.

3. The method of claim 1, wherein the request to generate the secondary account in relation to the primary account is received from the first entity associated with the primary account.

4. The method of claim 1, wherein the identifier for the secondary account is a token.

5. The method of claim 1, wherein each protocol is associated with a priority level, the method further comprising:
   identifying that at least two protocols among the set of protocols are in conflict;
   selecting one of the at least two protocols based on the priority level associated with the at least two protocols; and
   removing remaining one of the at least two protocols from the set of protocols.

6. A server device comprising:
   a processor; and
   a memory including instructions that, when executed with the processor, cause the server device to, at least:
      receive a request to generate a secondary account in relation to a primary account associated with a first entity;
      generate the secondary account in association with a number of protocols, the number of protocols indicating transactions that can be authorized at a particular status associated with the secondary account;
receive an itinerary associated with the secondary account, the itinerary indicating a plurality of statuses associated with the secondary account during specified periods of time;
maintain the primary account to be valid and the secondary account to be invalid outside the specified periods of time as indicated in the itinerary;
transmit an identifier for the secondary account to a client device of a second entity associated with the secondary account;
upon receiving a request to complete a transaction that includes the identifier for the secondary account, generate a set of protocols from the number of protocols based on one or more of the plurality of statuses associated with the secondary account at a time that the request to complete the transaction is received;
determine that a first portion of the transaction is in compliance with the set of protocols and that a second portion of the transaction is not in compliance with the set of protocols based upon at least whether the transaction is of a transaction type that can be completed at a time of the transaction;
receive a request to adjust at least one of the number of protocols from the second entity;
dynamically adjust at least one of the number of protocols associated with the secondary account upon approval from the first entity; and
complete the transaction by:
processing the first portion of the transaction using the primary account associated with the first entity,
processing a first amount of the second portion of the transaction that is in compliance with adjusted number of protocols using the primary account associated with the first entity, and
processing a second amount of the second portion of the transaction that is not in compliance with adjusted number of protocols using a third account associated with the second entity.

7. The server device of claim 6, wherein the determining that the second portion of the transaction is in compliance with the set of protocols comprises identifying one or more threshold values associated with the set of protocols and determining whether the transaction is above or below the one or more threshold values.

8. The server device of claim 7, wherein the one or more threshold values includes a currency threshold.

9. The server device of claim 6, wherein the request to complete the transaction is received from a resource provider.

10. The server device of claim 9, wherein the resource provider receives the identifier for the secondary account via an application installed upon the client device.

11. The server device of claim 10, wherein the resource provider maintains a physical store location and the application installed upon the client device is a digital wallet.

* * * * *